(12) United States Patent
Tibbetts et al.

(10) Patent No.: US 10,569,309 B2
(45) Date of Patent: Feb. 25, 2020

(54) EQUIPMENT CLEANING SYSTEM AND METHOD

(71) Applicant: General Electric Company, Schenectady, NY (US)

(72) Inventors: Nicole Tibbetts, Niskayuna, NY (US); Bernard Patrick Bewlay, Niskayuna, NY (US); Sean Robert Keith, Cincinnati, OH (US); Byron Andrew Pritchard, Jr., Cincinnati, OH (US); Brian Kalb, Montgomery, OH (US); Evan Jarrett Dolley, Niskayuna, NY (US); Andrew James Jenkins, Nantgarw (GB); Alistair Searing, Nantgarw (GB); Stephen Francis Rutkowski, Duanseburg, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/969,041

(22) Filed: Dec. 15, 2015

(65) Prior Publication Data

US 2017/0165721 A1   Jun. 15, 2017

(51) Int. Cl.
| | | |
|---|---|---|
| *B08B 3/12* | (2006.01) | |
| *B08B 3/08* | (2006.01) | |
| *B08B 3/10* | (2006.01) | |
| *B08B 9/00* | (2006.01) | |
| *C11D 3/20* | (2006.01) | |

(Continued)

(52) U.S. Cl.
CPC .................. *B08B 3/12* (2013.01); *B08B 3/08* (2013.01); *B08B 3/102* (2013.01); *B08B 9/00* (2013.01); *C11D 3/2086* (2013.01); *C11D 11/0041* (2013.01); *F01D 25/002* (2013.01)

(58) Field of Classification Search
None
See application file for complete search history.

(56) References Cited

U.S. PATENT DOCUMENTS

| | | |
|---|---|---|
| 4,836,858 A | 6/1989 | Reinhart |
| 5,123,433 A | 6/1992 | Fridsma et al. |

(Continued)

FOREIGN PATENT DOCUMENTS

| | | |
|---|---|---|
| DE | 298 05 737 U1 | 7/1998 |
| EP | 0 305 827 A1 | 3/1989 |

(Continued)

OTHER PUBLICATIONS

Marlin; [Ultrasonic Cleaning Baskets-Boxes-Containers]; Feb. 2014.*

(Continued)

*Primary Examiner* — Mikhail Kornakov
*Assistant Examiner* — Pradhuman Parihar
(74) *Attorney, Agent, or Firm* — Christopher R. Carroll; The Small Patent Law Group LLC

(57) ABSTRACT

A cleaning system and method uses a tank holding a fluid detergent and an equipment assembly formed from a plurality of discrete components joined together. One or more ultrasound transducers remove one or more deposits on the equipment assembly by generating and propagating high frequency ultrasound waves into the fluid detergent while the equipment assembly is in contact with the fluid detergent.

8 Claims, 12 Drawing Sheets

(51) Int. Cl.
  *C11D 11/00* (2006.01)
  *F01D 25/00* (2006.01)
  *C23G 1/02* (2006.01)
  *C23G 3/00* (2006.01)
  *B64F 5/30* (2017.01)

(56) References Cited

U.S. PATENT DOCUMENTS

| | | | |
|---|---|---|---|
| 5,818,241 A | 10/1998 | Kelly | |
| 5,891,267 A * | 4/1999 | Schaeffer | C23C 28/00 148/206 |
| 5,926,024 A | 7/1999 | Blount et al. | |
| 5,938,855 A * | 8/1999 | Bowden, Jr. | B08B 3/12 134/1 |
| 6,026,832 A | 2/2000 | Sato et al. | |
| 6,165,525 A * | 12/2000 | Rolle | A47J 37/047 426/238 |
| 6,572,709 B1 | 6/2003 | Kaneda et al. | |
| 7,305,998 B2 | 12/2007 | Watt | |
| 8,595,929 B2 | 12/2013 | Manjooran et al. | |
| 2002/0103093 A1* | 8/2002 | LaGraff | B08B 3/12 510/185 |
| 2003/0028287 A1* | 2/2003 | Puskas | B06B 1/0269 700/266 |
| 2003/0122535 A1 | 7/2003 | Williams et al. | |
| 2003/0123324 A1* | 7/2003 | Kuo | B01F 3/0092 366/262 |
| 2005/0017599 A1 | 1/2005 | Puskas | |
| 2007/0023142 A1 | 2/2007 | Lagraff et al. | |
| 2007/0068551 A1 | 3/2007 | Garimella | |
| 2007/0125163 A1 | 6/2007 | Dria et al. | |
| 2007/0158064 A1 | 7/2007 | Pribnow et al. | |
| 2009/0293906 A1 | 12/2009 | Baddeley | |
| 2009/0314312 A1* | 12/2009 | Fuchigami | B08B 15/02 134/9 |
| 2015/0159122 A1* | 6/2015 | Tibbetts | C11D 7/3209 134/22.18 |

FOREIGN PATENT DOCUMENTS

| | | | |
|---|---|---|---|
| EP | 0508894 | 10/1992 | |
| EP | 0 583 653 A1 | 2/1994 | |
| JP | 49119272 U | 10/1974 | |
| JP | S54-103264 A | 8/1979 | |
| JP | H09-283485 A | 10/1997 | |
| JP | 3133847 B2 * | 2/2001 | B08B 3/12 |
| JP | 2003-504204 A | 2/2003 | |
| JP | 2004-181420 A | 7/2004 | |
| JP | 3133847 U | 7/2007 | |
| JP | 2008-301699 A | 12/2008 | |
| JP | 2012-062834 A | 3/2012 | |
| JP | 2013-056316 A | 3/2013 | |
| WO | 2013076479 A1 | 5/2013 | |

OTHER PUBLICATIONS

English Machine Translation of JP-3133847-B2.*
Extended European Search Report and Opinion issued in connection with corresponding EP Application No. 16201850.1 dated Jun. 8, 2017.
Office Action issued in connection with corresponding CA Application No. 2951094 dated Nov. 10, 2017.
Machine Translation and Notification of Reasons for Refusal issued in connection with corresponding JP Application No. 2016-235529 dated Nov. 14, 2017.
Machine Translation and Decision to Grant issued in connection with corresponding JP Application No. 2016-235529 dated Aug. 7, 2018.
Machine Translation and First Office Action and Search issued in connection with corresponding CN Application No. 201611159950.4 dated Dec. 13, 2018 (Office Action translation is not available).
First Examination Report dated Jun. 4, 2019, for corresponding Indian Application No. 201644041633.
Search Report dated Jun. 8, 2018, for corresponding TW Application No. 105139499.
Office Action dated Jun. 8, 2018, for corresponding TW Application No. 105139499.
Machine Translation and Japanese Office Action issued in connection with corresponding JP Application No. 2016235529 dated Mar. 13, 2018.
Second Office Action for corresponding CN Application No. 201611159950.4 dated Oct. 18, 2019.
English Translation of the Second Office Action for corresponding CN Application No. 201611159950.4 dated Oct. 18, 2019.
English Translation of the previously cited First Office Action for corresponding CN Application No. 201611159950.4 dated Dec. 8 2018.

* cited by examiner

EQUIPMENT CLEANING SYSTEM AND METHOD

FIELD

Embodiments of the subject matter disclosed herein relate to systems and methods for cleaning equipment assembled from multiple separate parts, such as engines and turbines.

BACKGROUND

Equipment such as engines and turbines can accumulate deposits over time. For example, engines and turbines coupled with wings of aircraft can accumulate deposits (e.g., quartz or other deposits formed from sand, dust, and/or other materials) on exterior surfaces and/or internal surfaces. These and other types of deposits can degrade part durability and engine performance. Eventually, the deposits must be cleaned from the engines and engine parts.

Current cleaning systems and methods remove the engine and/or turbines from the larger turbine system (e.g., the aircraft) so that the engine and/or engine parts can be cleaned. The engines and turbines are broken down or otherwise separated into the separate parts that previously were connected to form the engines and turbines. The separate parts are then cleaned and reassembled into the engines and turbines. The cleaned and re-assembled engines and turbines are then placed back onto the turbine system for additional operation in propelling the turbine system.

Aircraft engines and high performance turbines possess very fine cooling holes that allow higher gas temperatures in the combustor and turbine. During operation of aircraft engines in environments that contain fine-scale dust, such as dust measured by PM10 level (e.g., a particulate matter less than 10 microns), the dust can accumulate in the fine scale cooling holes and reduce the cooling efficiency of the engines and turbines.

The dust also deposits on cooled surfaces and creates an insulating layer between the surface and the cooling medium, which can reduce the cooling efficiency of the engines and turbines. The reduced cooling efficiency can increase component operating temperatures and reduce the useful life span of the components. Additionally, the particulate matter that is entrained in the air that enters the turbine engine and the cooling passages can contain sulphur-containing species that can corrode the components.

BRIEF DESCRIPTION

In one embodiment, a cleaning method includes immersing an aircraft engine assembly formed from multiple parts into a fluid detergent in a tank, exposing the aircraft engine assembly to ultrasound waves having a frequency greater than 40 kHz, and generating cavitation of the fluid detergent to remove deposits on one or more of the parts of the aircraft engine assembly without damaging the aircraft engine assembly.

In another embodiment, another cleaning method includes placing an equipment assembly into contact with a fluid detergent, the equipment assembly formed from a plurality of discrete components joined together to form the equipment assembly and removing one or more deposits on the equipment assembly by exposing the equipment assembly to high frequency ultrasound waves while the equipment assembly is in contact with the fluid detergent.

In another embodiment, a cleaning system includes a tank configured to hold a fluid detergent and an equipment assembly formed from a plurality of discrete components joined together and one or more ultrasound transducers configured to remove one or more deposits on the equipment assembly by generating and propagating high frequency ultrasound waves into the fluid detergent while the equipment assembly is in contact with the fluid detergent.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
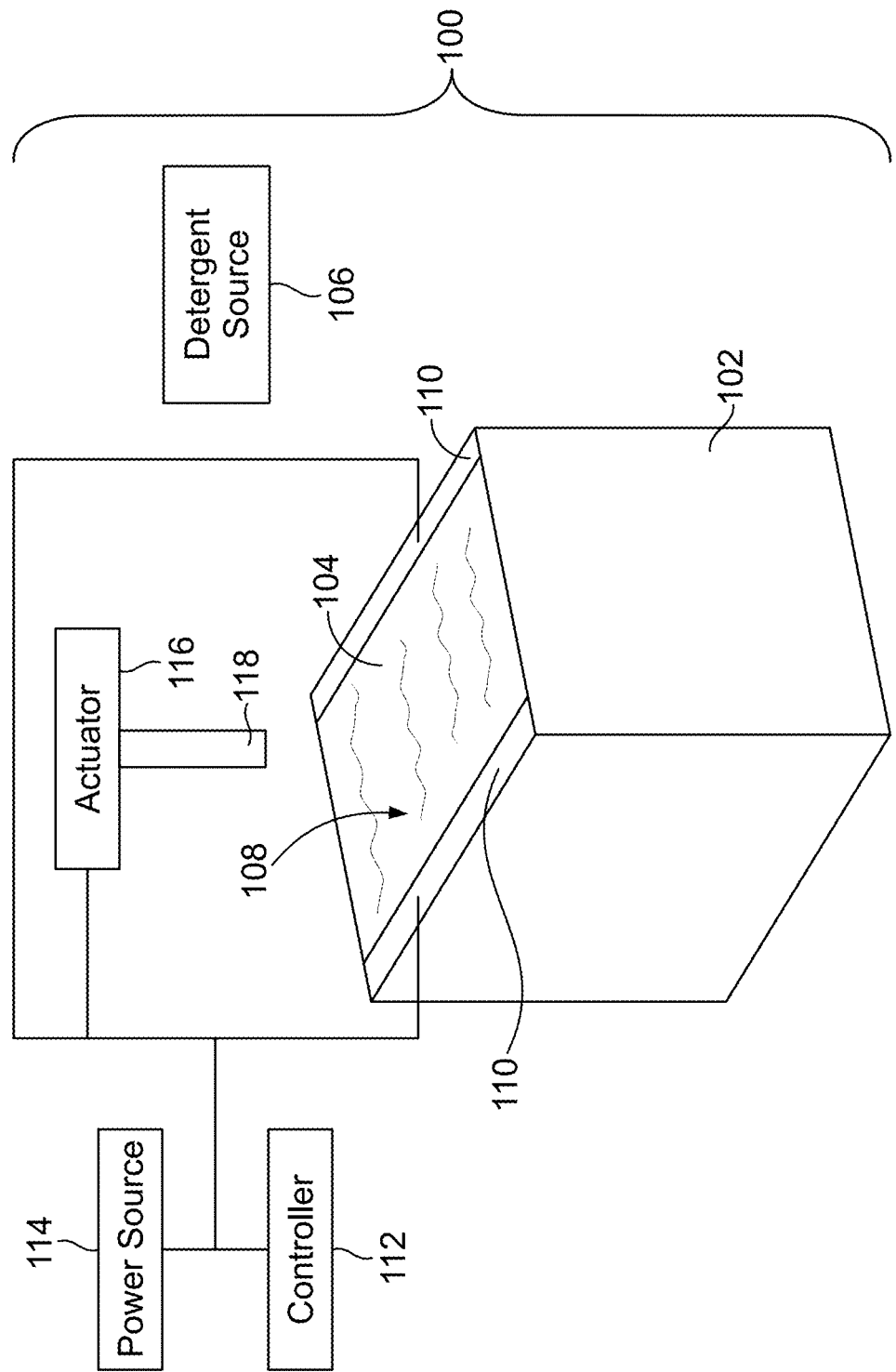
FIG. 1 illustrates one embodiment of an equipment cleaning system.

One or more embodiments of the inventive subject matter described herein provide systems and methods for cleaning assembled equipment of systems, such as engines or turbines of turbine powered systems (e.g., vehicles). The systems and methods can clean the engines, turbines, or other equipment while the engines, turbines, or equipment remain assembled. For example, the equipment may be ultrasonically cleaned without taking the different parts that form the equipment apart from each other. The engines and engine parts may be cleaned to remove sand accumulation or other deposits on engine parts, such as turbine blades (e.g., high pressure turbine blades) shrouds, nozzles, vanes, seal components, valve stems, nozzle boxes, etc.

In one aspect, the systems and methods described herein may be used to provide for the ultrasonic cleaning of aircraft (or other vehicle system) engine alloys and components with sophisticated and complex geometries, including components with coatings. The components and the components with coatings can include turbine blades, turbine nozzles, disks, shafts, and seals. Not all embodiments of the inventive subject matter described and claimed herein are limited to engines, engine alloys, turbine blades, turbine nozzles, disks, shafts, seals, aircraft, or vehicle systems. At least one embodiment of the inventive subject matter may be used in connection with other types of equipment, systems, or the like.

The systems and methods described herein can clean assembled equipment while maintaining the integrity of the assembled equipment. The assembled equipment is formed from several discrete, separate parts or components that are connected with each other to form the assembled equipment. The equipment may be cleaned without fully separating all of the components from each other. In one aspect, the parts may be separate from each other prior to forming the assembled equipment, but may be joined together by adhesives, fasteners, seals, or the like.

In one aspect, the systems and methods described herein use high frequency ultrasonic waves for cleaning the assembled equipment. The high frequency ultrasound waves clean the assembled equipment without compromising the fatigue life of the equipment, such as by generating or propagating internal cracks, external cracks, pits, intergranular oxidation, intergranular attack, or the like. The cleaning approach can be directed toward components, components with coatings, components with thin coatings (including paints), and modules/partial assemblies of the assembled equipment. Some other ultrasound systems and methods may damage the parts of equipment by generating or propagating internal cracks, external cracks, pits, intergranular oxidation, intergranular attack, or the like. Alternatively, one or more embodiments of the inventive subject matter described herein may be used for cleaning individual parts or components of the assembled equipment separate from each other.

The high frequency ultrasound waves (e.g., waves having frequencies greater than 40 kHz, at least 80 kHz, up to 100 kHz, up to 120 kHz, or the like) can be used in conjunction with a citric acid-based detergent to clean a broad range of components within the assembled equipment, such as an aircraft engine. Aircraft engine components in aircraft engines can have sophisticated external geometries and complex internal geometries that make the components and engine otherwise difficult to clean. In order to provide uniform cleaning, the assembled equipment can be rotated and translated in an ultrasonic tank during ultrasound cleaning to improve uniformity of the cleaning action affected by the detergent and ultrasonic transducers. In one aspect, the assembled equipment can be ultrasonically cleaned without the use of any chlorofluorocarbons, such as 1,1,1-trichloroethane.

FIG. 1 illustrates one embodiment of an equipment cleaning system 100. The cleaning system 100 can be used to ultrasonically clean surfaces (internal and/or external surfaces) of equipment assemblies, such as equipment formed from two or more discrete components. The equipment that is cleaned can include, for example, engines, turbines, parts of engines, parts of turbines, or the like, while two or more separate parts of the equipment remain connected or affixed to each other. In one embodiment, the equipment assemblies that are cleaned can include turbine buckets, discs, or the like, while the buckets are connected with the discs, etc.

The cleaning system 100 includes a tank 102 that holds a fluid detergent 104. The tank 102 defines a chamber in which the fluid detergent 104 is placed, such as from a source 106 of the detergent ("Detergent Source" in FIG. 1). Optionally, the tank 102 may be formed as an enclosure that wraps around an equipment assembly to enclose the assembly inside the tank 102 and provide space around the assembly in which the detergent 104 is placed. For example, the tank 102 may be a flexible body that is wrapped around the assembly while the assembly is connected with a larger system (e.g., a wing of an aircraft) to allow for cleaning of the assembly.

The source 106 can represent a container, hose, or the like, from which the detergent 104 is dispensed into the tank 102. The detergent 104 can include a citric acid-based detergent, such as a detergent having 0.1 to 0.5 percent by weight of a citric acid. The pH of the detergent 104 may be less than seven. The citric acid-based detergent has been found by the inventors to be more successful in cleaning the external and internal surfaces of mechanically complex equipment assemblies relative to other detergents. The detergent 104 includes one or more water-soluble surfactants that combine with the deposits to make the deposits more soluble for removal from the surfaces of the equipment assembly. In one embodiment, the detergent 104 and ultrasound waves remove foreign deposits, and not coatings, from the equipment assembly. Deposits may differ from coatings in that the deposits may be more widely varied than coatings in terms of the sizes (e.g., surface area) of the deposits and coatings, in terms of thicknesses of the deposits versus the coatings, the chemistry or minerals included therein, etc. Additionally, deposits may differ from coatings in that the coatings may be provided on the equipment assemblies during manufacture, inspection, or repair, whereas deposits accumulate on the equipment assembly from use or being stationary over time.

In one embodiment, the detergent 104 includes a reagent composition that selectively dissolves constituents of foreign material forming the deposits while physically removing silicate material in the deposits. For example, the detergent 104 can have a formulation that selectively dissolves at least one of oxide-based, chloride-based, sulfate-based, and carbon-based constituents of the foreign material. More specifically, the detergent 104 can have a formulation that selectively dissolves oxide-based constituents of the foreign material including calcium, sulfur, sodium, potassium, magnesium, silicon, and/or aluminum. Examples of oxide-based and sulfate-based constituents include, but are not limited to, calcium sulfate, magnesium sulfate, silicon dioxide (e.g., quartz), feldspars, mica, and clay. The detergent 104 also selectively dissolves chloride-based constituents of the foreign material including sodium and/or potassium. Examples of chloride-based constituents include, but are not limited to, sodium chloride and potassium chloride. The reagent composition also selectively dissolves carbon-based constituents of the foreign material including calcium, oxygen, and/or magnesium. Examples of carbon-based constituents include, but are not limited to, calcium carbonate and magnesium carbonate.

The detergent 104 also can have a formulation that is substantially unreactive with materials other than the oxide-based, chloride-based, sulfate-based, and carbon-based constituents of the foreign material forming the deposits. More specifically, the detergent 104 may be substantially unreactive with metallic materials such as, but not limited to, nickel, titanium, aluminum, vanadium, chromium, iron, and cobalt. Similarly, the detergent 104 can be substantially unreactive with non-metallic materials used to fabricate protective coatings and/or underlying material of the equipment assemblies described herein, including but not limited to rare earth element ceramic oxides, ceramic matrix composites, polymeric matrix composites, and other non-metallic composite materials. As such, damage to the protective coatings and/or underlying materials of turbine components is substantially limited or avoided.

In one embodiment, the detergent 104 includes a reagent composition having water within a range between about 25 percent and about 70 percent by volume of the detergent 104, an acidic component within a range between about 1 percent and about 50 percent by volume of the detergent 104, and an amine component within a range between about 1 percent and 40 percent by volume of the detergent 104. The acidic component of the detergent 104 may be a primary driver that facilitates selective dissolution of the oxide-based, chloride-based, sulfate-based, and carbon-based constituents of the foreign material forming the deposits. Examples of acidic components include, but are not limited to, citric acid, glycolic acid, poly acrylic acid, and combinations thereof. The amine component may act as a surfactant that facilitates reducing the surface tension between the detergent 104 and the foreign material forming the deposits. Examples of such amine components include, but are not limited to, monoisopropanol amine and triethanol amine. The detergent 104 may be formed by diluting the reagent composition with water prior to immersing the equipment assembly into the detergent 104, as described herein. In one example embodiment, the pH value of the cleaning solution is less than about 5.

In one embodiment, a first reagent composition for use in forming the detergent 104 includes water within a range between about 40 percent and about 60 percent by volume of the reagent composition, dipropylene glycol monoethyl ether within a range between about 20 percent and about 30 percent by volume of the reagent composition, propylene glycol n-butyl ether within a range between about 1 percent and about 10 percent by volume of the reagent composition, monoisopropanol amine within a range between about 1 percent and about 5 percent by volume of the reagent composition, and glycolic acid within a range between about 1 percent and about 5 percent by volume of the reagent composition. In this embodiment, the reagent composition includes Luminox® ("Luminox" is a registered trademark of Alconox, Inc. of White Plains, N.Y.). The detergent 104 may be formed by diluting the first reagent composition with water by a factor of up to about 18, where sodium is the limiting dilution factor.

In another example, a second reagent composition for use in forming the detergent 104 includes water within a range between about 25 percent and about 35 percent by volume of the reagent composition, dipropylene glycol monoethyl ether within a range between about 15 percent and about 25 percent by volume of the reagent composition, monoisopropanol amine within a range between about 30 percent and about 40 percent by volume of the reagent composition, alcohol alkoxylate within a range between about 1 percent and about 5 percent by volume of the reagent composition, and ethylene glycol butyl ether within a range between about 5 percent and about 10 percent by volume of the reagent composition. In this embodiment, the reagent composition is Detergent 8® ("Detergent 8" is a registered trademark of Alconox, Inc. of White Plains, N.Y.). The detergent 104 may be formed by diluting the second reagent composition with water by a factor of up to about 3, where fluorine is the limiting dilution factor.

In another example, a third reagent composition for use in forming the detergent 104 includes water within a range between about 50 percent and about 70 percent by volume of the reagent composition, glycolic acid within a range between about 5 percent and about 15 percent by volume of the reagent composition, citric acid within a range between about 5 percent and about 15 percent by volume of the reagent composition, triethanol amine within a range between about 2 percent and about 7 percent by volume of the reagent composition, and alcohol alkoxylate within a range between about 1 percent and about 5 percent by volume of the reagent composition. In this embodiment, the reagent composition can include Citrajet® ("Citrajet" is a registered trademark of Alconox, Inc. of White Plains, N.Y.). The detergent 104 can be formed by diluting the third reagent composition with water by a factor of up to about 32, where sodium is the limiting dilution factor.

In yet another example, a fourth reagent composition for use in forming the detergent 104 includes water within a range between about 50 percent and about 70 percent by volume of the reagent composition, glycolic acid within a range between about 5 percent and about 15 percent by volume of the reagent composition, citric acid within a range between about 5 percent and about 15 percent by volume of the reagent composition, triethanol amine within a range between about 1 percent and about 5 percent by volume of the reagent composition, alcohol alkoxylate within a range between about 1 percent and about 5 percent by volume of the reagent composition, and isopropylamine sulfonate within a range between about 1 percent and about 10 percent by volume of the reagent composition. The reagent composition can include Citranox® ("Citranox" is a registered trademark of Alconox, Inc. of White Plains, N.Y.). The detergent 104 can be formed by diluting the fourth reagent composition with water by a factor of up to about 35, where sulfur is the limiting dilution factor.

The use of the detergent 104 removes deposits on equipment assemblies, such as aircraft turbine engine assemblies, by improving airflow through the assemblies more than exposure of the assemblies to other types of detergents, such as alkaline-based detergents. The immersion of the assemblies into the citric acid-based detergent 104 without exposing the assemblies to high frequency ultrasound waves results in little to no removal of deposits and, as a result, little to no improvement in airflow through the assemblies.

The tank 102 is shown as a five-sided box having an open top side 108 through which the detergent 104 and/or the equipment assembly to be cleaned is inserted. The tank 102 may remain open such that the detergent 104 and equipment assembly is not sealed or contained inside the tank 102 and the detergent 104 is not pressurized inside the tank 102. Alternatively, the tank 102 may be sealed and/or the detergent 104 pressurized within the tank 102.

One or more ultrasound transducers 110 are disposed in the tank 102. The transducers 110 are shown as being larger along two dimensions than a third dimension and disposed along opposing sides of the tank 102. Alternatively, a different number of transducers 110 and/or differently shaped transducers 110 may be used. The tank 102 is sufficiently large to hold both the fluid detergent 104 and the equipment assembly such that the equipment assembly is at least partially submerged (or is completely submerged) in the fluid detergent 104 in the tank 102. The transducers 110 generate ultrasound waves that propagate through the fluid detergent 104 toward the equipment assembly in the tank 102. As described herein, the ultrasound waves and the detergent 104 clean deposits from internal and/or external surfaces of the equipment assembly without damaging the assembly or coatings on the assembly.

The transducers 110 are controllably linked with a controller 112 and a power source 114. The controller 112 may represent an ultrasound controller that includes hardware circuitry having and/or connected with one or more processors (e.g., microprocessors, integrated circuits, field programmable gate arrays, or the like) that control generation of ultrasound waves from the transducers 110. The controller 112 dictates the flow of electric energy (e.g., voltage and/or current) from the power source 114 to the transducers 110. The power source 114 can represent a utility grid, one or more batteries, etc., that supply electric energy. The transducers 110 include piezoelectric elements that are excited by the power source 114 (as dictated by the controller 112) to generate the ultrasound waves.

The controller 112 may direct the transducers 110 to vibrate and generate high frequency ultrasound waves into the detergent 104. High frequency ultrasound waves can include ultrasound waves having an average or peak frequency greater than 40 kHz. Optionally, these waves can have an average or peak frequency of at least 80 kHz. The waves may have a frequency that does not exceed an upper limit, such as 100 kHz, 200 kHz, 300 kHz, 400 kHz, or the like. The high frequency ultrasound waves propagate through the fluid detergent 104 and remove deposits on the equipment assembly by causing cavitation in the fluid detergent 104. The deposits can include dust, sand, or other materials, that build up on the equipment assembly during use or exposure of the equipment assembly over time.

In one embodiment, the controller 112 may direct the transducers 110 to generate the ultrasound waves having a peak intensity within a designated range of a target frequency, such as 80 kHz. The ultrasound waves may not all have the same frequency of the target frequency, but may have several intensity peaks at different frequencies with the largest peak intensity at or within a designated range (e.g., 5 kHz, 10 kHz, etc.) of the target frequency.

Figure 12:
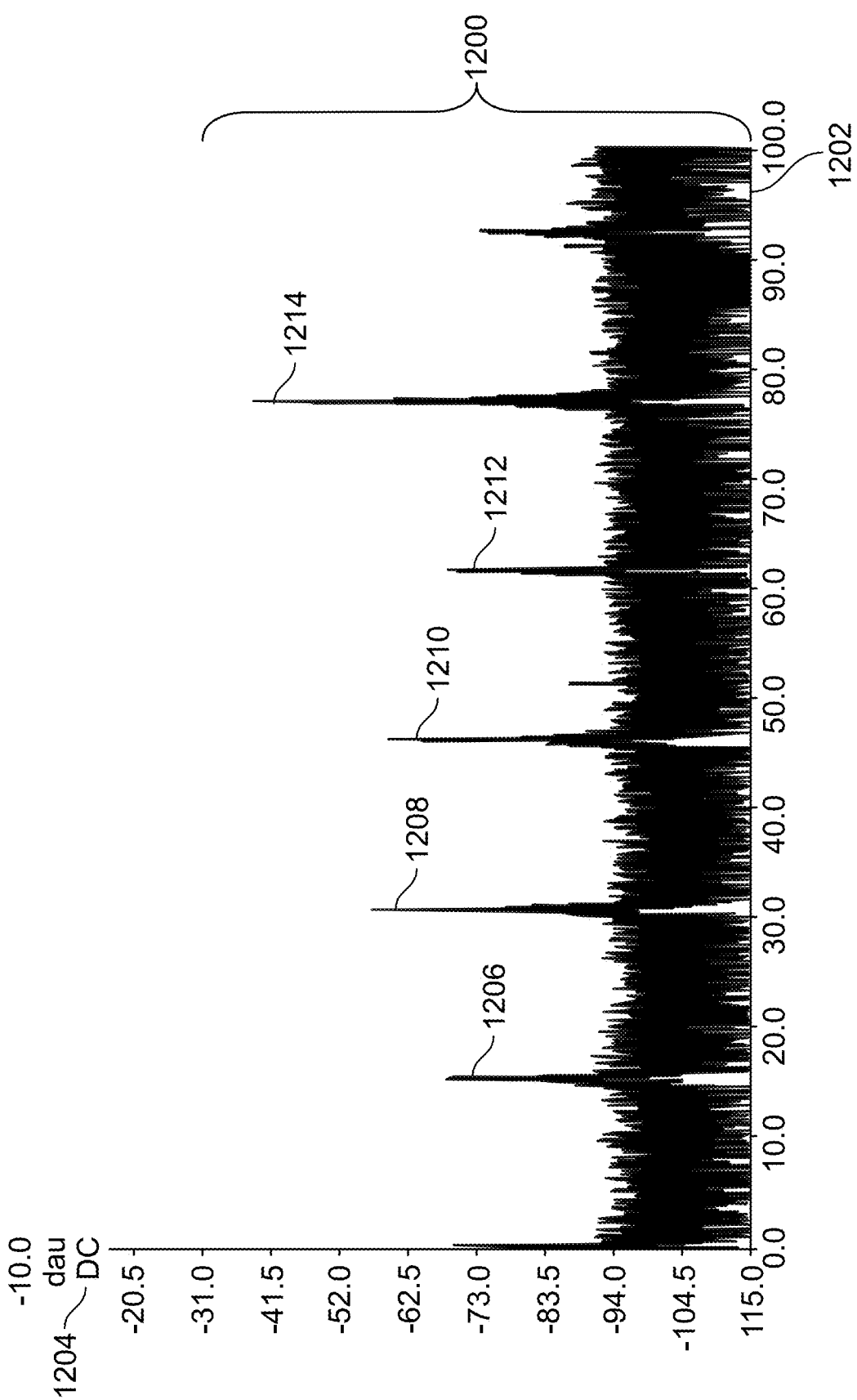
FIG. 12 illustrates spectral intensities of ultrasound waves generated by the transducers shown in FIG. 1 to have a target frequency of 80 kHz according to one example.

FIG. 12 illustrates spectral intensities 1200 of ultrasound waves generated by the transducers 110 shown in FIG. 1 to have a target frequency of 80 kHz according to one example. The intensities 1200 of the ultrasound waves are shown alongside a horizontal axis 1202 representative of frequencies of the ultrasound waves and alongside a vertical axis 1204 representative of intensities of the ultrasound waves at different frequencies (e.g., in terms of decibels). As shown in FIG. 12, the ultrasound waves may have intensity peaks 1206, 1208, 1210, 1212, 1214 at different frequencies. For example, the peak 1206 occurs around 15 kHz, the peak 1208 occurs around 31 kHz, the peak 1210 occurs around 47 kHz, the peak 1212 occurs around 61 kHz, and the peak 1214 occurs around 78 kHz. Although the peaks occur at different frequencies, the largest peak 1214 occurs within the designated range of the target frequency of 80 kHz. Therefore, even though the ultrasound waves may have a variety of different frequencies, the peak frequency having the greatest intensity, or an intensity that is larger than at least a designated percentage (e.g., 80%) of the other peaks, is the target intensity dictated by the controller 112.

Returning to the description of the system 100 shown in FIG. 1, the controller 112 may not direct the transducers 110 to focus the ultrasound waves in any particular direction. For example, in contrast to focused ultrasound waves, the ultrasound waves may be generated by the transducers 110 without being focused at any location within the equipment assembly or fluid detergent 104, such as locations of the deposits to be removed. The non-focused, high frequency ultrasound waves can propagate through the detergent 104 and remove the deposits from the equipment assembly using the high frequency ultrasound waves without generating cracks in any of the components of the equipment assembly, without damaging a coating on any of the components of the equipment assembly, and/or without damaging any seals between two or more of the components of the equipment assembly. The ultrasound waves can generate cavitation of the fluid detergent to remove the deposits without damaging the equipment assembly. For example, the ultrasound waves can create air bubbles at or between the deposits and the surfaces of the equipment assembly in the detergent to remove the deposits from the surfaces.

In the illustrated embodiment, the cleaning system 100 includes an agitator 116 that operates to move the equipment assembly within the detergent 104 in the tank 102. The agitator 116 can include a coupling mechanism 118, such as a piston, rod, clamp, or the like, that engages the equipment assembly to allow the agitator 116 to move the equipment assembly within the tank 102. The agitator 116 can include one or more motors, belts, gears, or the like, that are powered by the power source 114 (or another power source) and controlled by the controller 112 to rotate, lower, lift, or otherwise translate the equipment assembly into, out of, and/or within the tank 102. The controller 112 may direct the agitator 116 to rotate or otherwise translate the equipment assembly within the tank 102 to remove deposits from a variety of surfaces of the equipment assembly.

In one aspect, the agitator 116 and coupling mechanism 118 can prevent the equipment assembly from contacting one or more internal surfaces of the tank 102. The agitator 116 and coupling mechanism 118 may be positioned above the tank 102 in a location that prevents the equipment assembly from touching the ultrasound transducers 110, the bottom surface inside of the tank 102, or the internal vertical or side surfaces of the tank 102.

Figure 2:
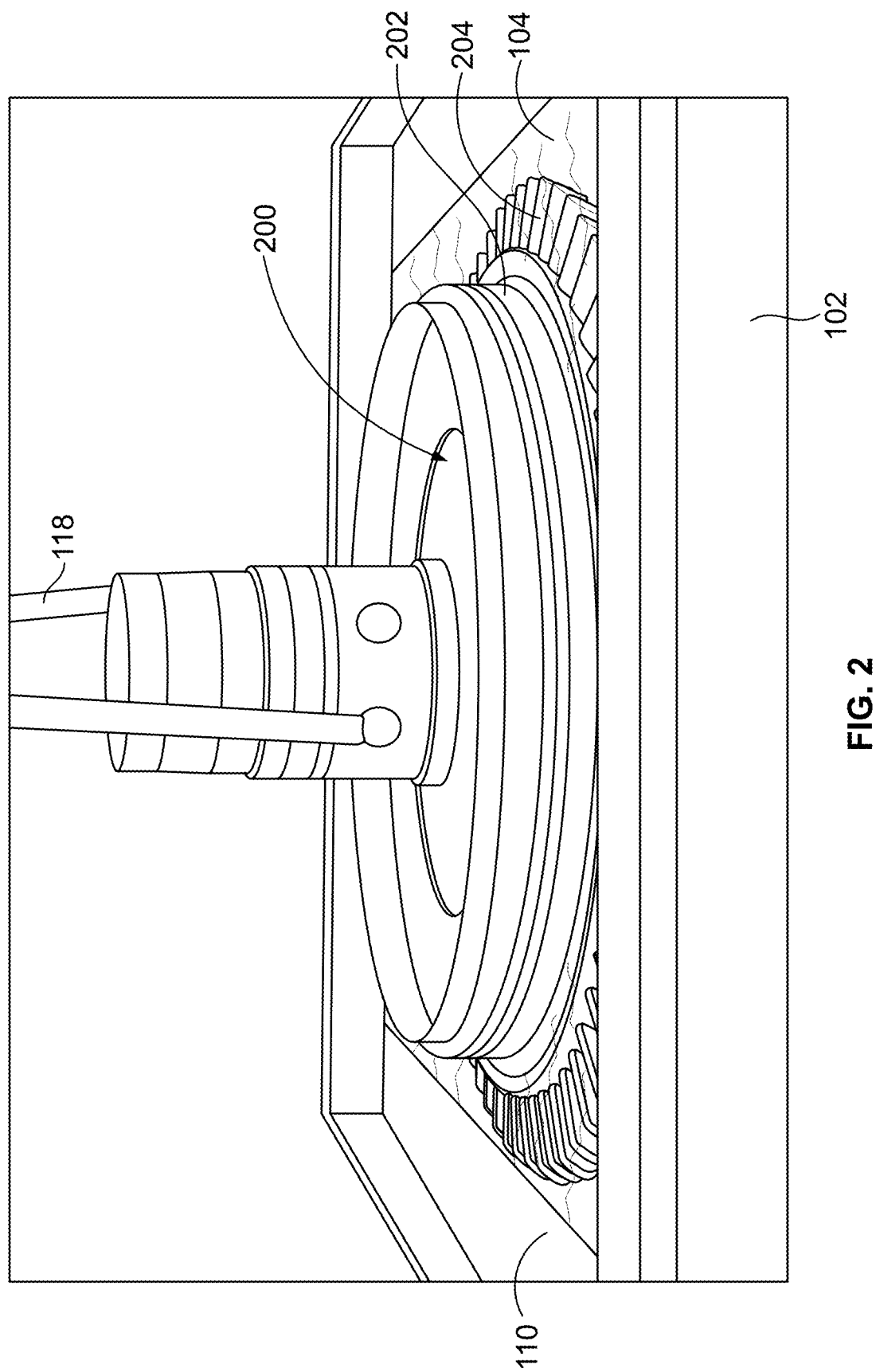
FIG. 2 illustrates a perspective view of an equipment assembly being lowered into a tank of the cleaning system shown in FIG. 1 according to one embodiment.
Figure 3:
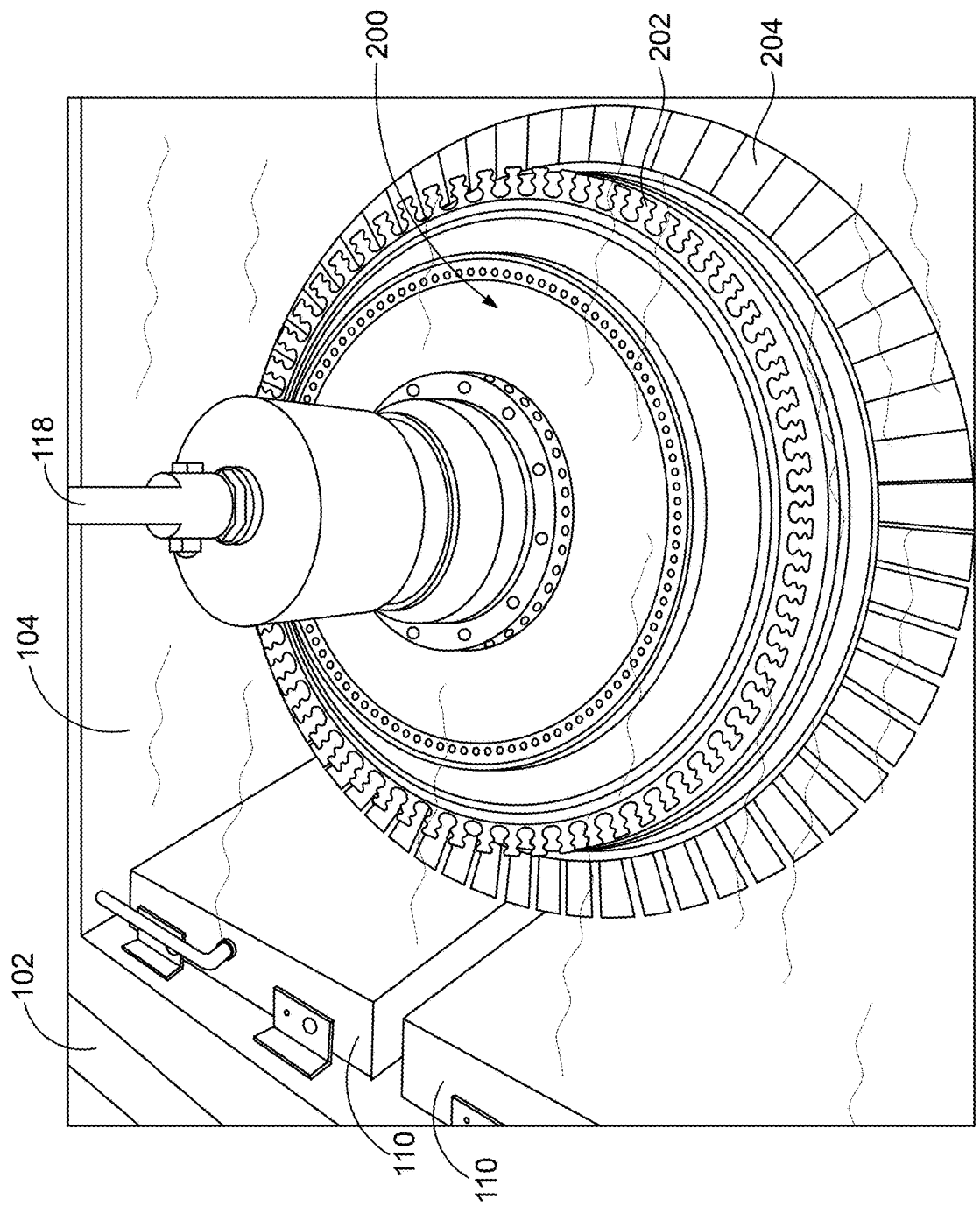
FIG. 3 illustrates a top view of the equipment assembly shown in FIG. 2 in fluid detergent in the tank shown in FIG. 1 according to one embodiment.

FIG. 2 illustrates a perspective view of an equipment assembly 200 being lowered into the tank 102 of the cleaning system 100 according to one embodiment. With continued reference to FIG. 2, FIG. 3 illustrates a top view of the equipment assembly 200 in the detergent 104 in the tank 102 according to one embodiment. The equipment assembly 200 is a turbine engine module assembly formed from a turbine disc 202 and several turbine blades 204 connected with the disc 202. The entire equipment assembly 200 may be lowered into the tank 102 by the agitator 116 (shown in FIG. 1) and coupling mechanism 118. Once the equipment assembly 200 is immersed in the bath that includes the detergent 104, the transducers 110 may be excited to generate high frequency ultrasound waves in the detergent 104. The equipment assembly 200 may be immersed in the bath when at least part of the areas sought to be cleaned are in the bath. Alternatively, the equipment assembly 200 may be immersed in the bath when at least half of the equipment assembly 200 is in the bath. Alternatively, the equipment assembly 200 may be immersed in the bath when all of the equipment assembly 200 is in the bath.

These ultrasound waves may propagate through the detergent 104 to cause cavitation on or around the deposits on the equipment assembly 200. This cavitation removes the deposits from the equipment assembly 200. Subsequent to cleaning the equipment assembly 200, the equipment assembly 200 may be removed from the tank 102, dried, and placed back into the turbine system (e.g., an aircraft) in which the equipment assembly 200 operates for additional use. As described herein, the equipment assembly 200 may be cleaned in this way without taking the equipment assembly 200 apart, such as by removing the blades 204 from the disc 202 and separately cleaning the blades 204 and/or disc 202.

Figure 4:
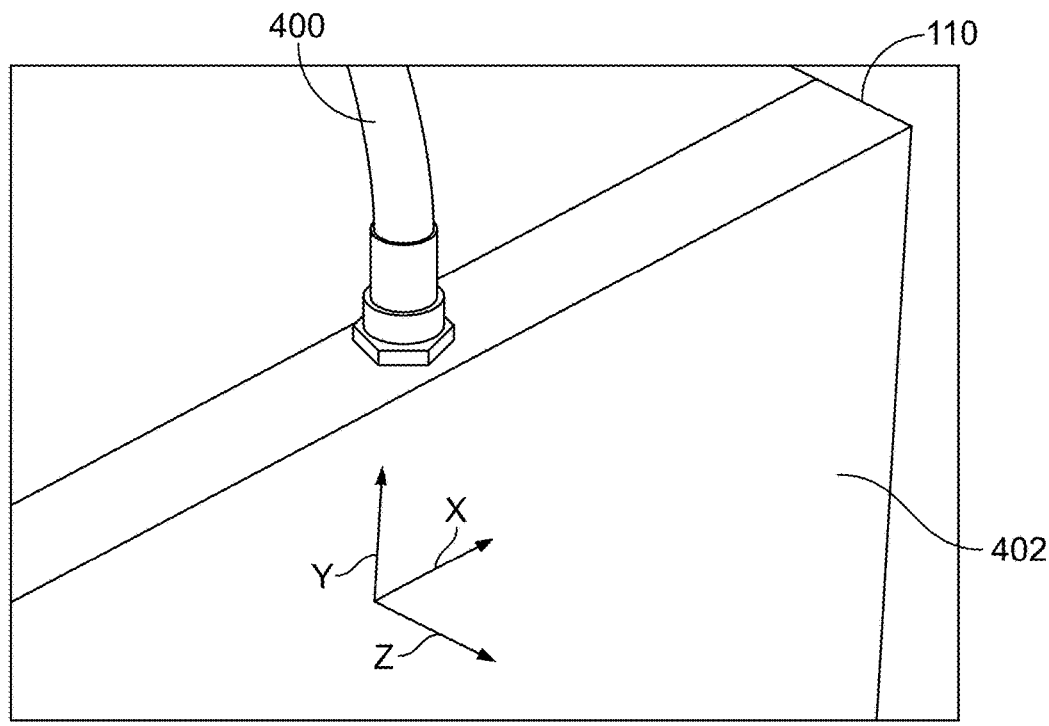
FIG. 4 illustrates a partial perspective view of an ultrasound transducer of the cleaning system shown in FIG. 1 according to one embodiment.

FIG. 4 illustrates a partial perspective view of one of the ultrasound transducers 110 of the cleaning system 100 according to one embodiment. The transducer 110 may be conductively coupled with the power source 114 and/or the controller 112 by one or more cables 400 shown in FIG. 4. The transducer 110 shown in FIG. 4 may be referred to as a plate transducer because the transducer 110 has an ultrasound emitting surface 402 that is larger in two orthogonal directions (e.g., along the x- and y-directions shown in FIG. 4) than in a third orthogonal direction (e.g., along the z-direction shown in FIG. 4). The transducer 110 may generate ultrasound waves that leave the transducer 110 from the surface 402 and propagate through the detergent 104 in the tank 102. The ultrasound waves may be emitted from all or more than a majority of the surface area of the surface 402 and may not be focused ultrasound waves. The surface 402 faces the interior of the tank 102 where the equipment assembly is located to cause the ultrasound waves to propagate toward the equipment assembly for cleaning the equipment assembly.

Figure 5:
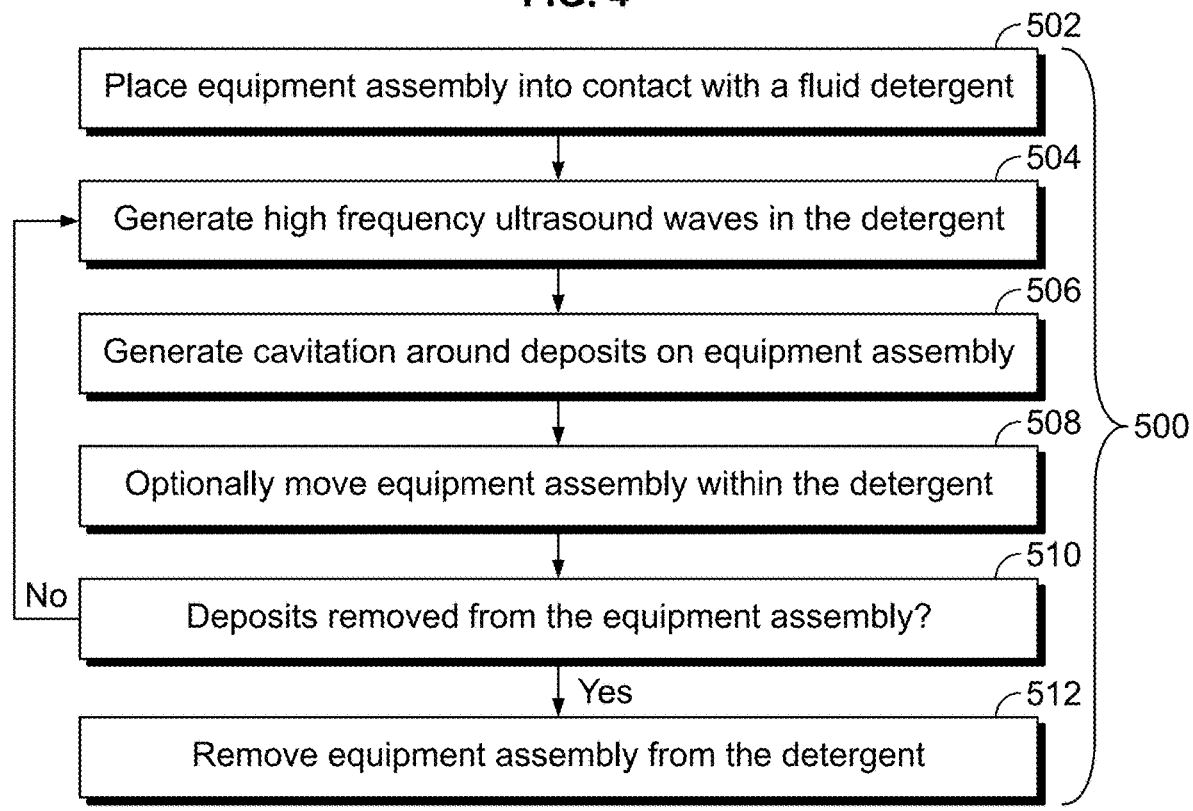
FIG. 5 illustrates a flowchart of one embodiment of a method for ultrasonically cleaning an equipment assembly.

FIG. 5 illustrates a flowchart of one embodiment of a method 500 for ultrasonically cleaning an equipment assembly. The method 500 may be used to remove deposits on one or more external and/or internal surfaces of an equipment assembly formed from several components (e.g., blades) joined together within the engine assembly while the components are still connected. The method 500 may be performed by one or more embodiments of the cleaning system 100 shown in FIG. 1 in one embodiment.

At 502, the equipment assembly is placed into contact with a fluid detergent. The equipment assembly may be immersed in a tank holding the fluid detergent so that the fluid detergent is able to enter into internal chambers of the equipment assembly and/or otherwise contact the surfaces of the equipment assembly on which the deposits are located.

At 504, high frequency ultrasound waves are generated in the detergent. The ultrasound waves may have frequencies that are larger than used by other systems to clean the equipment assembly. For example, the ultrasound waves may have frequencies greater than 40 kHz, at least 80 kHz, or another frequency.

At 506, cavitation is generated around the deposits on the equipment assembly. The ultrasound waves may generate cavitation in the detergent to assist in lifting the deposits from the surfaces of the equipment assembly. At 508, the equipment assembly is optionally moved within the tank holding the detergent. The equipment assembly may be rotated, translated, lifted, lowered, or the like, to cause the ultrasound waves to propagate to and generate cavitation around many different surfaces of the equipment assembly. Alternatively, the equipment assembly may remain stationary in the detergent in the tank.

At 510, a determination is made as to whether the deposits are removed from the equipment assembly. In one embodiment, this determination may be made automatically based on a length of time that the equipment assembly is exposed to the ultrasound waves in the detergent. For example, the equipment assembly may remain in the detergent for a designated period of time and, upon completion of this period of time, removed from the detergent. Alternatively, the equipment assembly may be removed from the detergent following visual inspection and verification that the deposits have been removed.

If the deposits have been removed, then flow of the method 500 can proceed toward 512. But, if more deposits remain (or the period of time for cleaning the equipment assembly has not expired), then flow of the method 500 can return toward 504 for additional cleaning of the equipment assembly. At 512, the equipment assembly is removed from the detergent. The equipment assembly may be lifted from the tank holding the detergent and dried or otherwise prepared for use in a larger powered system, such as a turbine powered system.

The cleaning systems and methods described herein may be used to remove deposits from surfaces of aircraft turbine engine assemblies to improve airflow through the assemblies. The airflow may be measured as the volume and/or speed of air flowing through the turbine engine assemblies before cleaning as described herein (e.g., with deposits on internal and/or external surfaces of the engine assemblies) and after cleaning as described herein.

Figure 6:
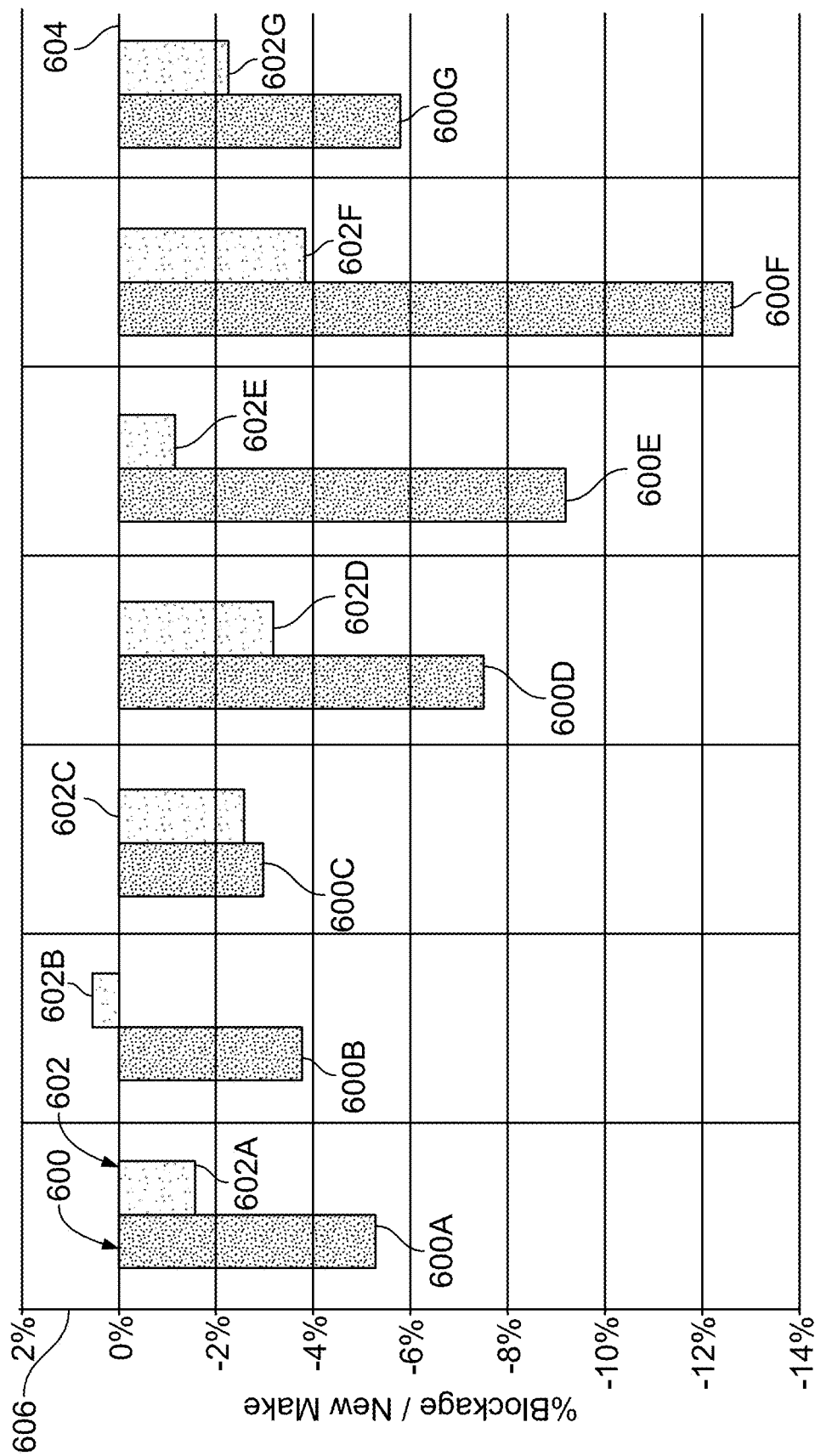
FIG. 6 illustrates measured airflows through different aircraft turbine engine assemblies before and after cleaning the engine assemblies as described herein.

FIG. 6 illustrates measured airflows 600, 602 (e.g., airflows 600A-G, 602A-G) through different aircraft turbine engine assemblies before and after cleaning the engine assemblies as described herein. The airflows 600, 602 are shown alongside a horizontal axis 604 representative of the different engine assemblies and a vertical axis 606 representative of the percentage of airflow that is reduced by the presence of the deposits on and/or inside the engine assemblies. Each group of the airflows 600, 602 (e.g., the airflows 600A, 602A in one group, the airflows 600B, 602B in another group, etc.) represents the reduced airflows (in terms of percentages) before and after cleaning. The airflows 600 represent the pre-cleaning reductions in airflow while the airflows 602 represent the post-cleaning reductions in airflow. The ultrasound waves used to clean the different engine assemblies were emitted with 80 kHz frequencies.

As shown in FIG. 6, the airflow is improved for each of the different engine assemblies after cleaning according to one or more embodiments of the cleaning systems and methods described herein. For example, the engine assembly associated with the airflows 600A, 602A improved airflow by cleaning in that the reduction in airflow was reduced from approximately −5.25% before cleaning (e.g., the airflow 600A) to approximately −1.75% after cleaning (e.g., the airflow 602A). Other engine assemblies exhibit even larger improvements in airflow post-cleaning, such as the engine assemblies associated with the group of airflows 600D, 602D, the group of airflows 600E, 602E, and the group of airflows 600F, 602F.

Figure 7:
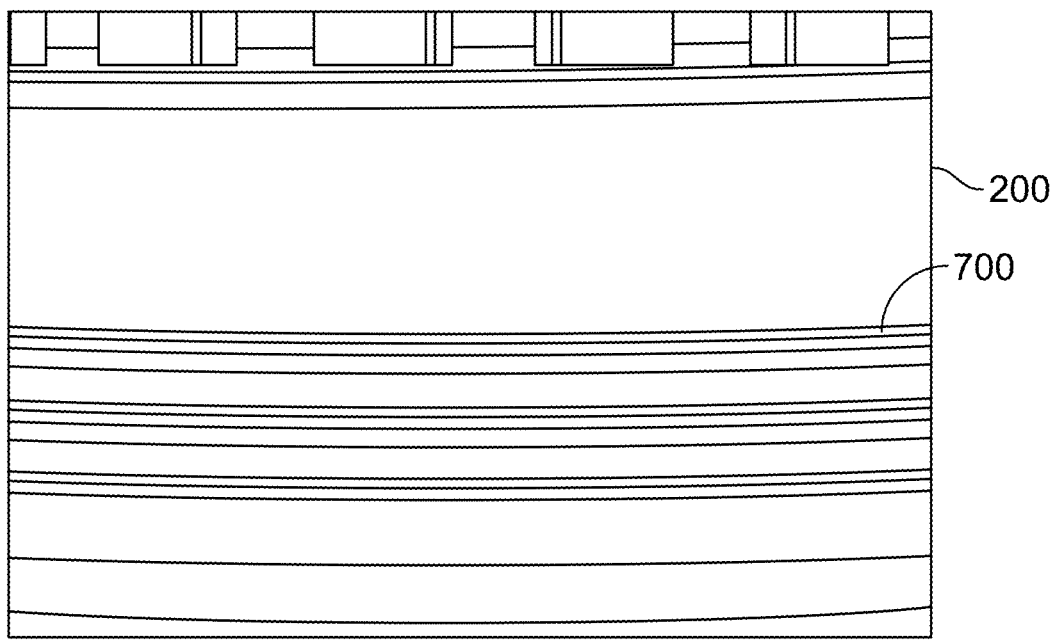
FIG. 7 is a partial view of an exterior surface of a rotor disk seal of the equipment assembly shown in FIG. 2 prior to cleaning using the cleaning systems and methods described herein according to one example.
Figure 8:
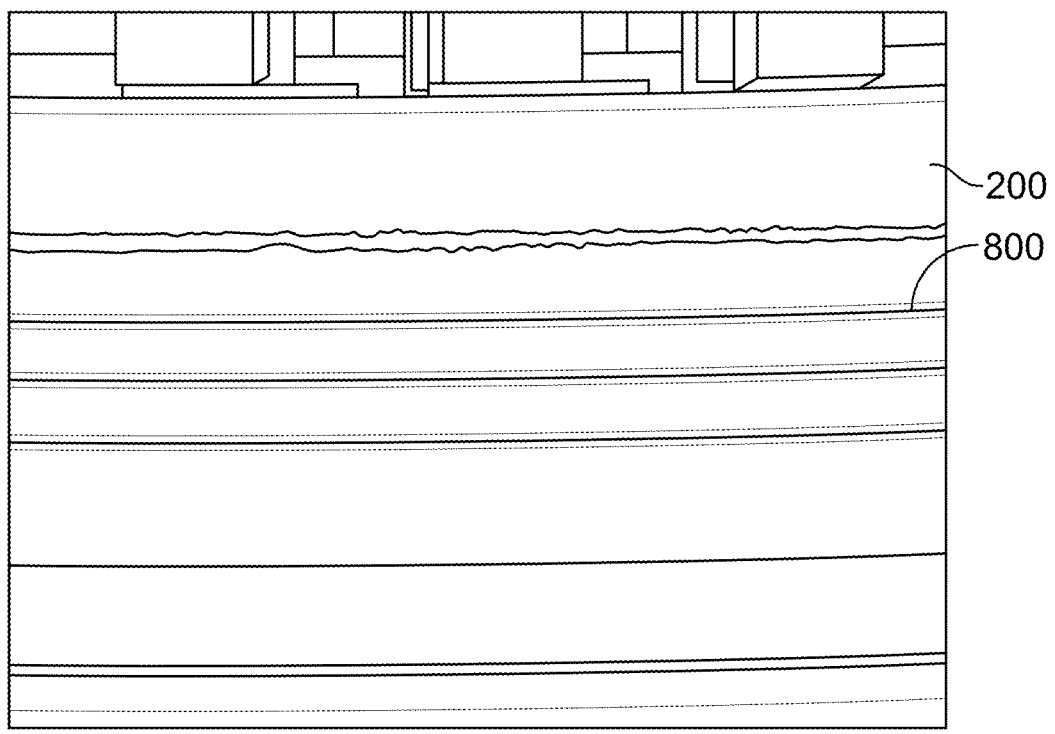
FIG. 8 is a partial view of the exterior surface of the same rotor disk seal of the equipment assembly shown in FIG. 7 after cleaning using the cleaning systems and methods described herein according to one example.

FIG. 7 is a partial view of an exterior surface of a rotor disk seal of the equipment assembly 200 shown in FIG. 2 prior to cleaning using the cleaning systems 100 and methods described herein according to one example. FIG. 8 is a partial view of the exterior surface of the same rotor disk seal of the equipment assembly 200 shown in FIG. 7 after cleaning using the cleaning systems 100 and methods described herein according to one example. Several deposits 700 (shown in FIG. 7) are present on the exterior of the rotor disk pre-cleaning, but are removed to leave clean surfaces 800 (shown in FIG. 8). The deposits 700 are removed without damaging the surfaces of the equipment assembly 200 by using high frequency ultrasound waves in the presence of a citric acid-based detergent.

Figure 10:
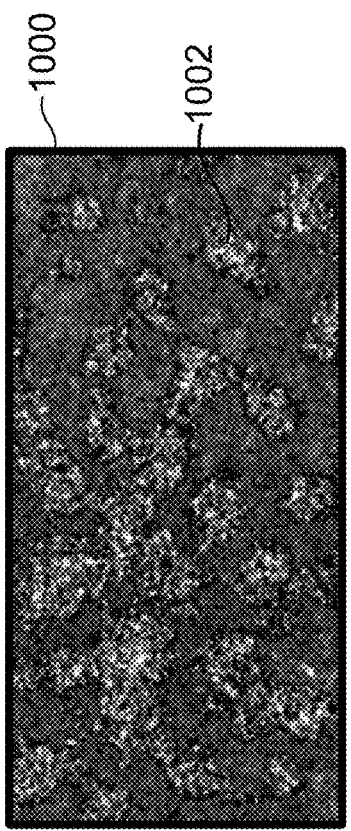
FIG. 10 illustrates another photograph (at magnification of 100×) of the surface of coupons representing an aircraft turbine engine assembly after cleaning with lower frequency ultrasound waves and a citric acid-based detergent according to one example.
Figure 11:
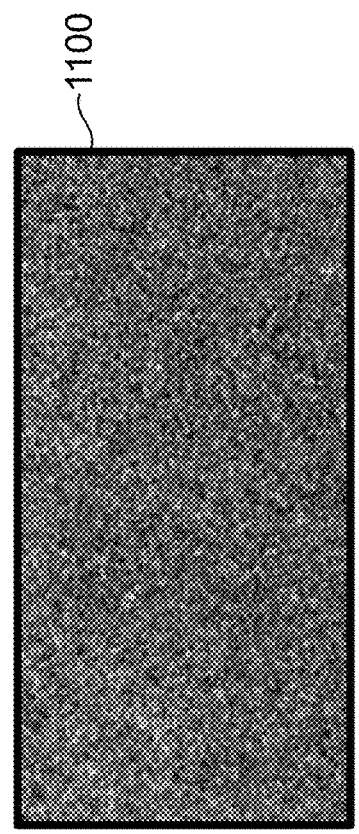
FIG. 11 illustrates another photograph (at magnification of 100×) of the surface of coupons representing an aircraft turbine engine assembly after cleaning with higher frequency ultrasound waves and a citric acid-based detergent according to one example.
Figure 9:
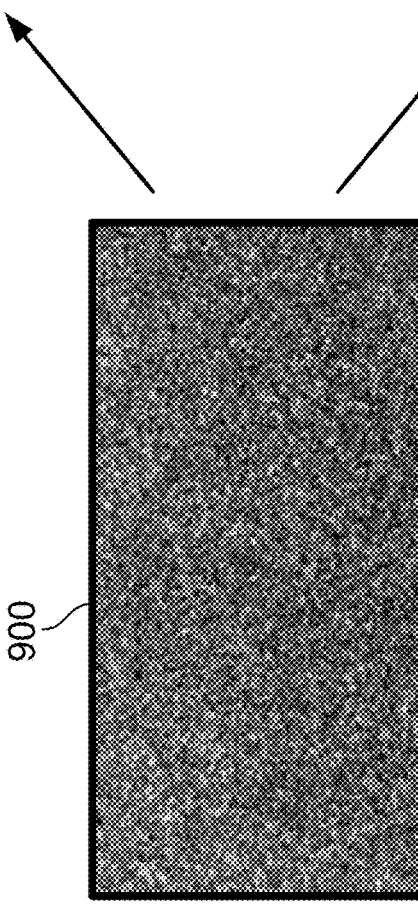
FIG. 9 illustrates a photograph (at a magnification of 100×) of a surface of coupons representing an aircraft turbine engine assembly prior to cleaning with high frequency ultrasound waves and a citric acid-based detergent according to one example.

FIGS. 9 through 11 illustrate photographs 900, 1000, 1100 of surfaces of coupons representing an aircraft turbine engine assembly according to several examples. The photographs 900, 1000, 1100 are 100× magnification photographs that illustrate the damage (e.g., corrosion) caused to surfaces of the engine assembly when different frequencies are used for generating the ultrasound waves. The surfaces shown in FIGS. 9 through 11 all include the same alloy coating. In the photograph 900, the pictured surface has not been ultrasonically cleaned with the cleaning systems 100 or methods described herein. In the photograph 1000, the pictured surface has been ultrasonically cleaned by placing the engine assembly in the tank 102 with a citric acid-based detergent 104 and exposing the engine assembly to ultrasound waves having frequencies of 40 kHz or less. In the photograph 1100, the pictured surface has been ultrasonically cleaned by placing the engine assembly in the same tank 102 with the same citric acid-based detergent 104 as the photograph 1000, but with exposing the engine assembly to ultrasound waves having an 80 kHz frequency.

As shown by a comparison of the photographs 900, 1000, 1100 exposing the surface in the photograph 900 to ultrasound waves having frequencies no greater than 40 kHz can result in damage to the surface, such as by generating spalls 1002 in the surface (shown in FIG. 10). The spalls 1002 indicate that the coating on the surface has been damaged by the ultrasound waves. In contrast, exposing the surface to ultrasound waves having frequencies that are at least 80 kHz do not damage the coating in that no spalls or other damage is present on the surface after cleaning, as shown in FIG. 11.

Figure 13:
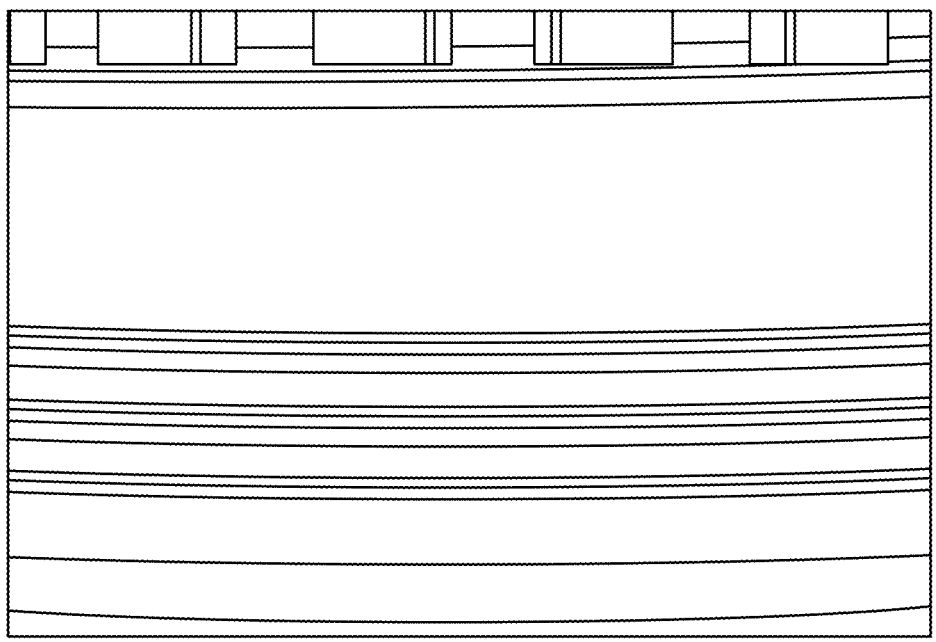
FIG. 13 is another partial view of an exterior surface of a seal of a rotor disk of the equipment assembly shown in FIG. 2 prior to cleaning using the cleaning systems and methods described herein according to one example.
Figure 14:
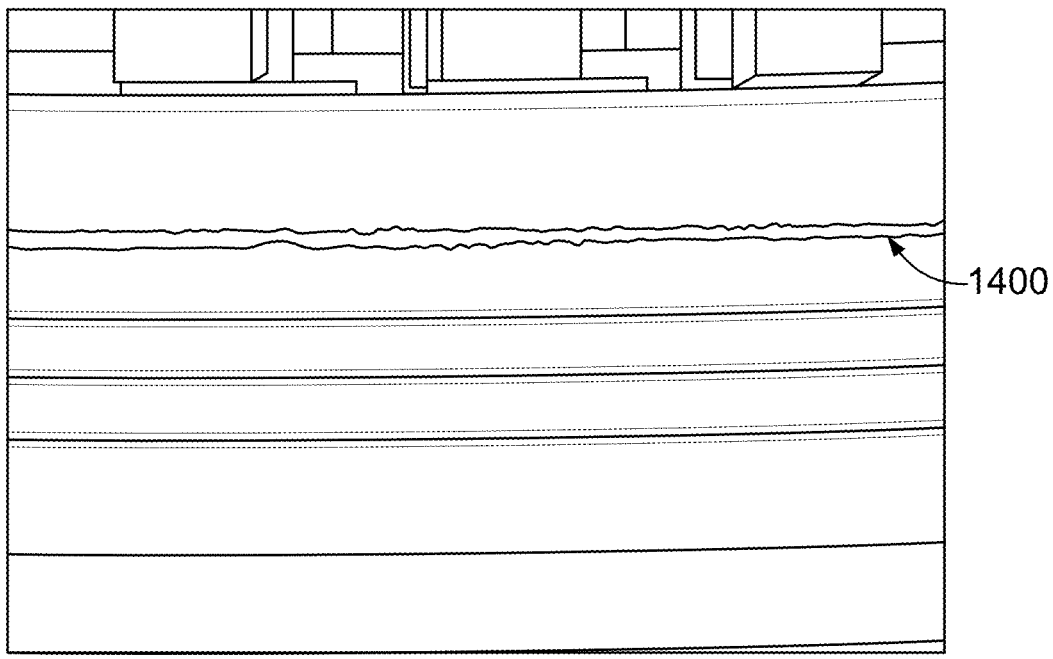
FIG. 14 is another partial view of the exterior surface of the seal of the same rotor disk of the equipment assembly shown in FIG. 13 after cleaning using the cleaning systems and methods described herein according to one example.

FIG. 13 is another partial view of an exterior surface of a seal of a rotor disk of the equipment assembly 200 shown in FIG. 2 prior to cleaning using the cleaning systems 100 and methods described herein according to one example. FIG. 14 is another partial view of the exterior surface of the seal of the same rotor disk of the equipment assembly 200 shown in FIG. 13 after cleaning using the cleaning systems 100 and methods described herein according to one example. The rotor disk shown in FIGS. 13 and 14 was cleaned using a target frequency of 40 kHz without any shielding or damping of the ultrasound waves. As shown in FIG. 14, cleaning with the target frequency of 40 kHz can result in some unacceptable spalling 1400 of a coating of the rotor disk. This spalling 1400 indicates damage to a coating of the rotor disk that may need to be repaired prior to placing the rotor disk back into use.

In order to prevent damage to the equipment assembly during ultrasonic cleaning, one or more shielding and damping devices may be used. The shielding and damping devices can be used for ultrasonic cleaning of aircraft engine alloys and components with sophisticated and complex geometries, including components with coatings. The components and the components with coatings can include turbine blades, turbine nozzles, disks, shafts, and seals. The shielding and damping devices ensure that no damaging ultrasound resonances are excited in any region of the components during cleaning that would otherwise cause damage to the components and/or coatings.

The shielding and damping device effectively protects the integrity of metal components, bond coats, anti-corrosion, seal, and thermal coatings both at the component and assembled scale under compressive strain. The shielding and damping device is effective over a range of power densities, such as from 1 to 20 watts per liter, and temperatures from ambient to 85 degrees centigrade (or another temperature). The shielding and damping devices are chemically resistant to fluids with sub-neutral pH.

Figure 15:
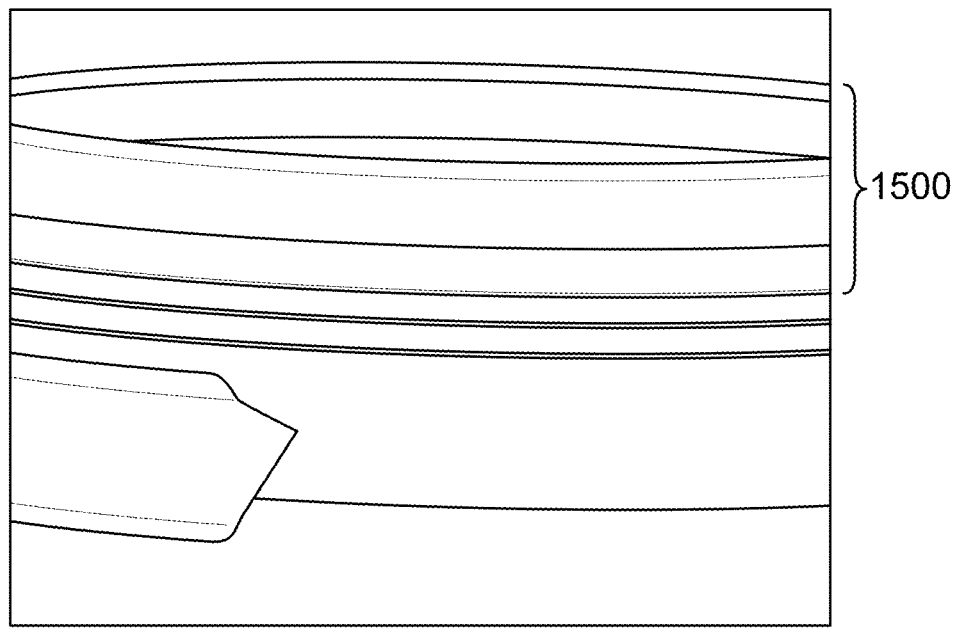
FIG. 15 illustrates a perspective view of a shielding and damping device according to one embodiment.
Figure 16:
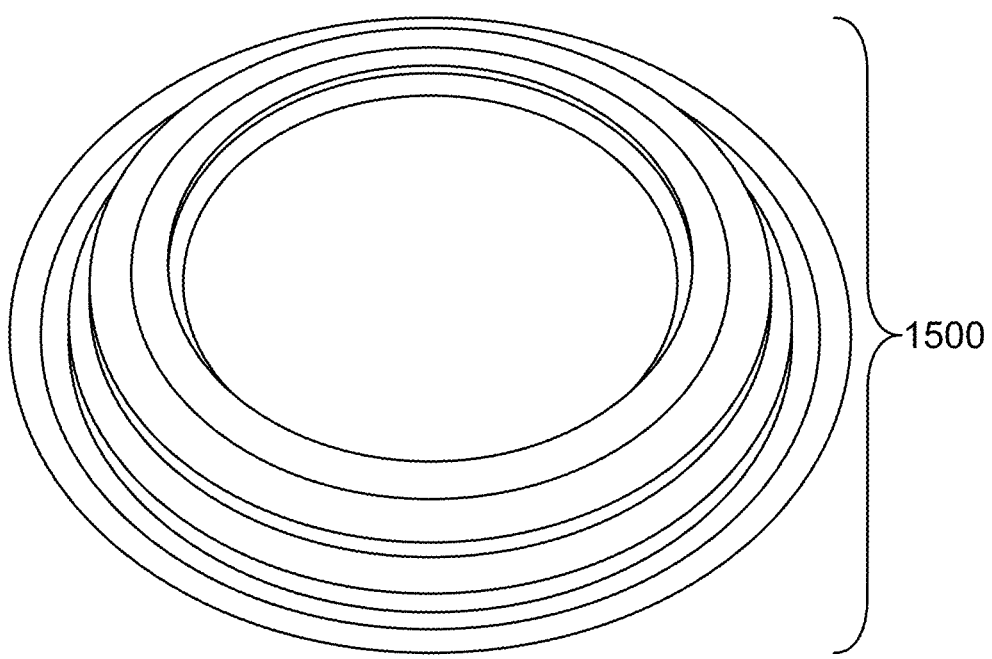
FIG. 16 illustrates another perspective view of the shielding and damping device shown in FIG. 15 according to one embodiment.
Figure 17:
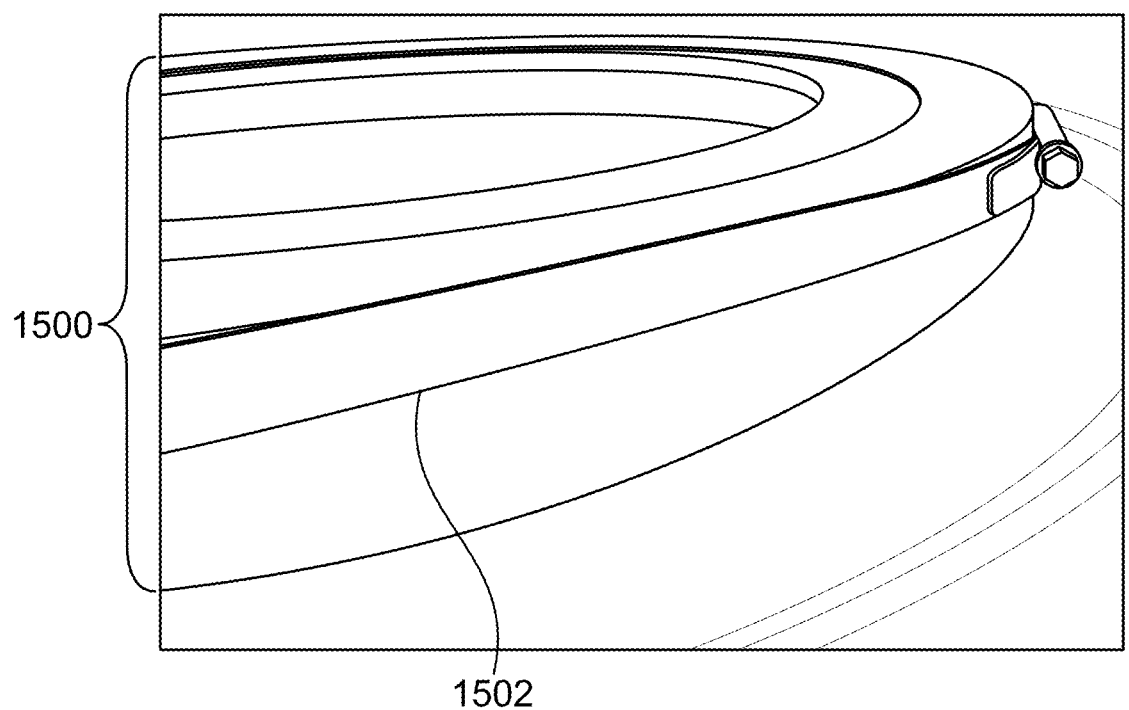
FIG. 17 illustrates another perspective view of the shielding and damping device shown in FIG. 15 according to one embodiment.

FIGS. 15 through 17 illustrate perspective views of a shielding and damping device 1500 according to one embodiment. The device 1500 may be placed onto the equipment assembly 200 and remain in contact with the equipment assembly 200 during ultrasonic cleaning of the equipment assembly 200. The device 1500 prevents resonant frequencies of the target frequency in the ultrasound waves from reaching and/or damaging the equipment assembly 200, such as by preventing spalling, cracking, pitting, etc., of metal components, bond coats, anti-corrosion, seal, and thermal coatings of the equipment assembly 200.

The device 1500 may be formed from a flexible, elastomeric material, such as rubber, neoprene, butyl rubber, natural rubber, or the like. Alternatively, the device 1500 may be formed from a rigid or semi-rigid material, such as a thermoplastic polymer. The device 1500 is formed in a ring shape to extend around an outer perimeter or periphery of the equipment assembly. A coupling mechanism 1502, such as a cable, clamp (e.g., hose clamp), etc., can secure the device 1500 to the equipment assembly.

Figure 18:
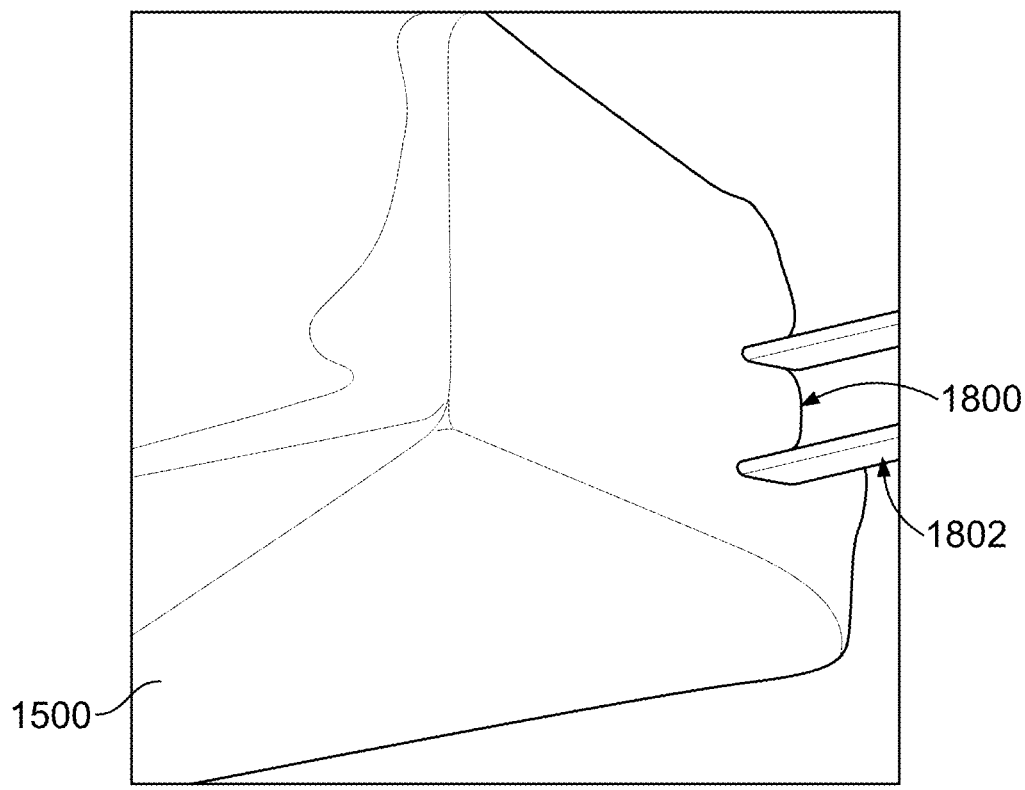
FIG. 18 illustrates a cross-sectional view of the shielding and damping device according to one embodiment.

FIG. 18 illustrates a cross-sectional view of the device 1500 according to one embodiment. The device 1500 includes an interior surface 1800 that faces the equipment assembly 200. As shown in FIG. 18, the interior surface 1800 has a shape that is complimentary to an exterior surface 1802 of the equipment assembly 200. For example, the exterior surface 1802 may have protruding rings that are received into valleys of the interior surface 1800 of the device 1500. The complimentary shape of the interior surface 1800 allows for the device 1500 to abut the exterior surface 1802 of the equipment assembly 200.

Figure 19:
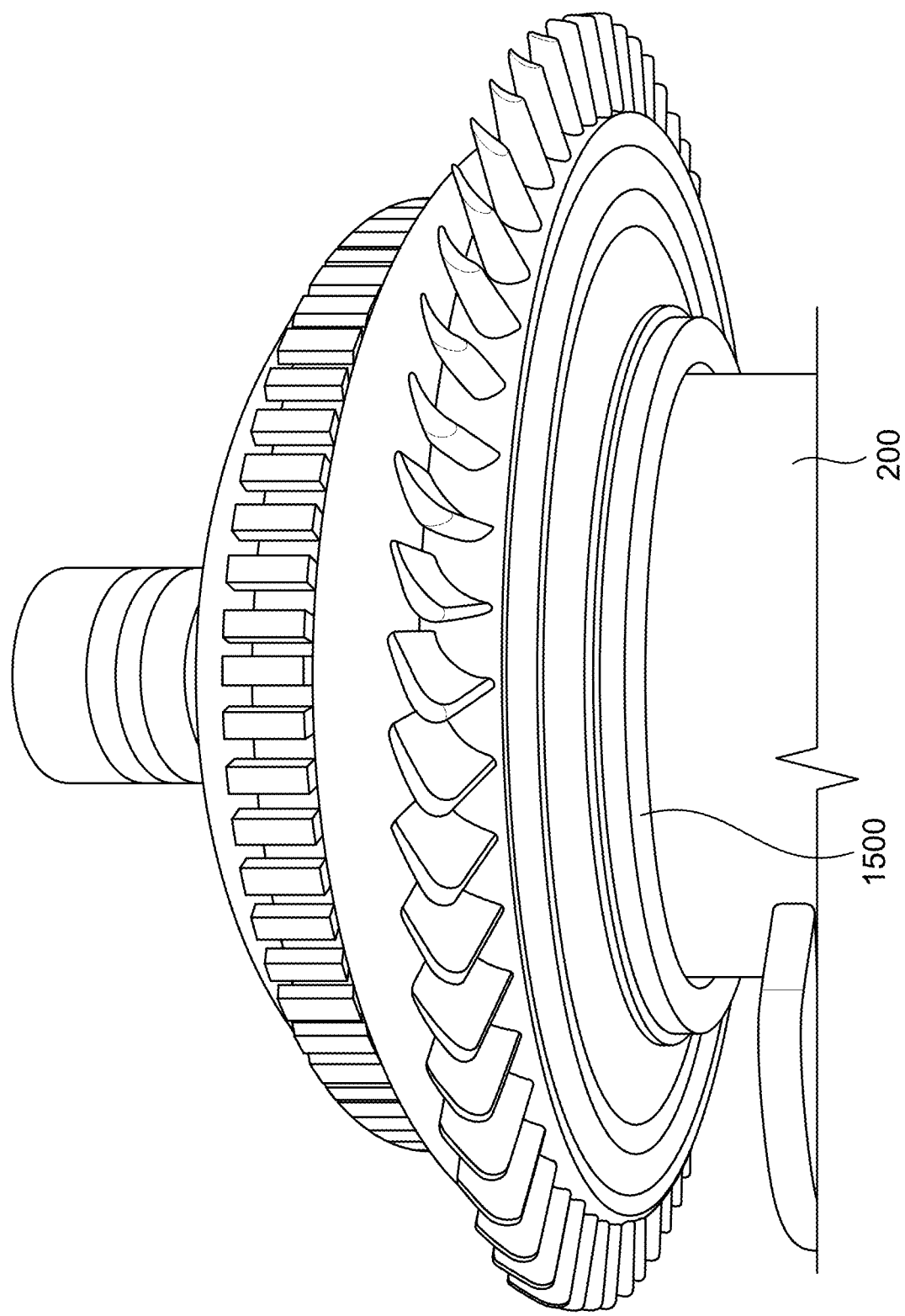
FIG. 19 illustrates the shielding and damping device disposed on the equipment assembly shown in FIG. 2 according to one example.

FIG. 19 illustrates the device 1500 disposed on the equipment assembly 200 according to one example. The device 1500 may be placed around the equipment assembly 200 prior to or during immersion of the equipment assembly 200 into the ultrasound bath. The equipment assembly 200 may then be exposed to the high frequency ultrasound waves described herein to clean the equipment assembly 200. As shown in FIG. 19, the device 1500 may not cover the entire equipment assembly 200. Instead, the device 1500 may be placed onto or around some, but not all, areas of the equipment assembly 200. The equipment assembly 200 and device 1500 may be exposed to the high frequency ultrasound waves in order to clean the equipment assembly 200, including the areas of the equipment assembly 200 that are covered by the device 1500, while avoiding damage to the equipment assembly 200.

In one embodiment, a cleaning method includes immersing an aircraft engine assembly formed from multiple parts into a fluid detergent in a tank, exposing the aircraft engine assembly to ultrasound waves having a frequency greater than 40 kHz, and generating cavitation of the fluid detergent to remove deposits on one or more of the parts of the aircraft engine assembly without damaging the aircraft engine assembly.

In one aspect, the ultrasound waves have a frequency that is at least 80 kHz.

In one aspect, generating cavitation of the fluid detergent removes the deposits without focusing the ultrasound waves at a location where the deposits are located.

In one aspect, the fluid detergent includes a citric acid detergent.

In another embodiment, another cleaning method placing an equipment assembly into contact with a fluid detergent, the equipment assembly formed from plural discrete components joined together to form the equipment assembly and removing one or more deposits on the equipment assembly by exposing the equipment assembly to high frequency ultrasound waves while the equipment assembly is in contact with the fluid detergent.

In one aspect, the high frequency ultrasound waves have a frequency that is greater than 40 kHz.

In one aspect, the high frequency ultrasound waves have a frequency that is at least 80 kHz.

In one aspect, removing the one or more deposits from the equipment assembly includes causing cavitation in the fluid detergent with the ultrasound waves.

In one aspect, removing the one or more deposits from the equipment assembly includes exposing the equipment assembly to the high frequency ultrasound waves without focusing the high frequency ultrasound waves at a location where the one or more deposits are located.

In one aspect, the fluid detergent includes citric acid.

In one aspect, placing the equipment assembly into contact with the fluid detergent includes immersing the equipment assembly into a tank that is at least partially filled with the fluid detergent.

In one aspect, the one or more deposits are removed from the equipment assembly using the high frequency ultrasound waves without generating cracks in any of the components of the equipment assembly, without damaging a coating on any of the components of the equipment assembly, and without damaging any seals between two or more of the components of the equipment assembly.

In one aspect, the equipment assembly includes a turbine engine module assembly.

In another embodiment, a cleaning system includes a tank configured to hold a fluid detergent and an equipment assembly formed from a plurality of discrete components joined together and one or more ultrasound transducers configured to remove one or more deposits on the equipment assembly by generating and propagating high frequency ultrasound waves into the fluid detergent while the equipment assembly is in contact with the fluid detergent.

In one aspect, the one or more ultrasound transducers are configured to generate the high frequency ultrasound waves at a frequency that is greater than 40 kHz.

In one aspect, the one or more ultrasound transducers and configured to generate the high frequency ultrasound waves at a frequency that is at least 80 kHz.

In one aspect, the one or more ultrasound transducers are configured to remove the one or more deposits from the equipment assembly by causing cavitation in the fluid detergent with the ultrasound waves.

In one aspect, the one or more ultrasound transducers are configured to remove the one or more deposits from the equipment assembly by exposing the equipment assembly to the high frequency ultrasound waves without focusing the high frequency ultrasound waves at a location where the one or more deposits are located.

In one aspect, the fluid detergent includes citric acid.

In one aspect, the tank is configured to hold both the fluid detergent and the equipment assembly such that the equipment assembly is at least partially submerged in the fluid detergent in the tank.

In one aspect, the one or more ultrasound transducers are configured to remove the one or more deposits from the equipment assembly using the high frequency ultrasound waves without generating cracks in any of the components of the equipment assembly, without damaging a coating on any of the components of the equipment assembly, and without damaging any seals between two or more of the components of the equipment assembly.

In one aspect, the equipment assembly includes a turbine engine module assembly.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A system comprising:
    a fluid detergent source for providing a fluid detergent, wherein a pH value of the fluid detergent is less than 7;
    a fluid detergent;
    a tank configured to hold the fluid detergent and an equipment assembly;
    one or more ultrasound transducers configured to remove one or more deposits on the equipment assembly by generating and propagating ultrasound waves having a frequency greater than 40 kHz into the fluid detergent while the equipment assembly is in contact with the fluid detergent;
    a controller for controlling the one or more ultrasound transducers; and
    a shielding and damping device configured to be placed into contact with the equipment assembly prior to exposing the equipment assembly to the ultrasound waves, wherein the shielding and damping device prevents damage to the equipment assembly by the ultrasound waves;
    wherein the tank comprises a flexible body that is wrapped around the equipment assembly while the equipment assembly is connected to a wing of an aircraft.

2. The system of claim 1, wherein the one or more ultrasound transducers are configured to generate the ultrasound waves at a frequency that is at least 80 kHz, and
    wherein the fluid detergent is unreactive with nickel, titanium, aluminum, vanadium, chromium, iron, and cobalt, and
    wherein the fluid detergent comprises:
    water within a range between about 25 percent and about 35 percent by volume of the reagent composition;
    dipropylene glycol monoethyl ether within a range between about 15percent and about 25 percent by volume of the reagent composition;
    monoisopropanol amine within a range between about 30 percent and about 40percent by volume of the reagent composition;
    alcohol alkoxylate within a range between about 1 percent and about 5 percent by volume of the reagent composition; and
    ethylene glycol butyl ether within a range between about 5 percent and about 10percent by volume of the reagent composition.

3. The system of claim 1, wherein the one or more ultrasound transducers are configured to remove the one or more deposits from the equipment assembly by causing cavitation in the fluid detergent with the ultrasound waves,
    wherein the fluid detergent is unreactive with rare earth element ceramic oxides, ceramic matrix composites, and polymeric matrix composites.

4. The system of claim 1, wherein the controller controls the one or more ultrasound transducers such that the equipment assembly is exposed to the ultrasound waves of the ultrasound transducers without focusing the ultrasound waves at a location where the one or more deposits are located, and
    wherein the amine comprises at least one of a monoisopropanol amine and a triethanol amine.

5. The system of claim 1, wherein the fluid detergent includes at least one of a glycolic acid and a poly acrylic acid, and
    wherein the fluid detergent is a reagent composition having water within a range between about 25 percent and about 70 percent by volume of the fluid detergent, an acidic component within a range between about 1 percent and about 50 percent by volume of the fluid detergent, and an amine component within a range between about 1 percent and 40percent by volume of the fluid detergent.

6. The system of claim 1 further comprising more than one ultrasound transducer,
    wherein the tank is configured to hold both the fluid detergent and the equipment assembly such that the equipment assembly is at least partially submerged in the fluid detergent in the tank.

7. The system of claim 5, wherein the shielding and damping device is formed from a flexible elastomeric material, and
    wherein the shielding and damping device is effective over a range of power densities from about 1 to about 20 watts per liter, and wherein the shielding and damping device is effective over a temperature range from ambient to about 85 degrees centigrade.

8. The system of claim 1, the equipment assembly further comprising:
   an agitator, the agitator comprising a coupling mechanism comprising at least one of a piston, a rod, and a clamp,
   wherein the one or more ultrasound transducers includes plate transducers, and
   where the agitator engages the equipment assembly to allow the agitator to move the equipment assembly within the tank.

* * * * *